United States Patent [19]
Kennedy

[11] 3,987,433
[45] Oct. 19, 1976

[54] ELECTROCHROMIC DISPLAY DRIVER HAVING INTERLEAVED WRITE AND ERASE OPERATIONS

[75] Inventor: Richard Howard Kennedy, Croton-on-Hudson, N.Y.

[73] Assignee: Timex Corporation, Waterbury, Conn.

[22] Filed: Sept. 2, 1975

[21] Appl. No.: 609,257

[52] U.S. Cl. .......................... 340/336; 340/324 M; 58/23 R; 58/50 R; 350/160 R
[51] Int. Cl.[2] .................................................. G09F 9/32
[58] Field of Search ........... 340/324 R, 324 M, 336; 58/23 R, 50 R; 350/160 R, 160 P, 160 LC

[56] References Cited
UNITED STATES PATENTS

| | | | |
|---|---|---|---|
| 3,476,460 | 11/1969 | Hansen et al. .................. | 350/160 R |
| 3,839,857 | 10/1974 | Berets et al. ................... | 350/160 LC |
| 3,878,537 | 4/1975 | Roncillat et al. ................ | 340/324 M |
| 3,895,372 | 7/1975 | Kaji et al. ........................ | 340/324 M |

*Primary Examiner*—Marshall M. Curtis

[57] ABSTRACT

A driving circuit for an electrochromic display cell wherein write and erase of a segment is effected by an alternating or pulse signal. A write or erase potential is applied across a segment and common electrode during a half cycle of the alternating/pulse signal which is predetermined to have a (activation) period less than that which is required to effect complete coloring or bleaching of the segment. Therefore, several cycles of the alternating/pulse signal are necessary to effect complete coloring or bleaching of the segment.

The electrochromic display is caused to have the appearance of simultaneous writing and erasing of a plurality of segments by applying a write or erase potential to the selected segments during each alternate half cycle of the alternating/pulse signal. For example, the write potential is applied to one segment during the first half cycle and the erase potential is applied to another segment during the second half cycle of one alternating/pulse signal. In this manner, gradual fade-in and fade-out of those segments being updated is effected over a several cycle period.

14 Claims, 5 Drawing Figures

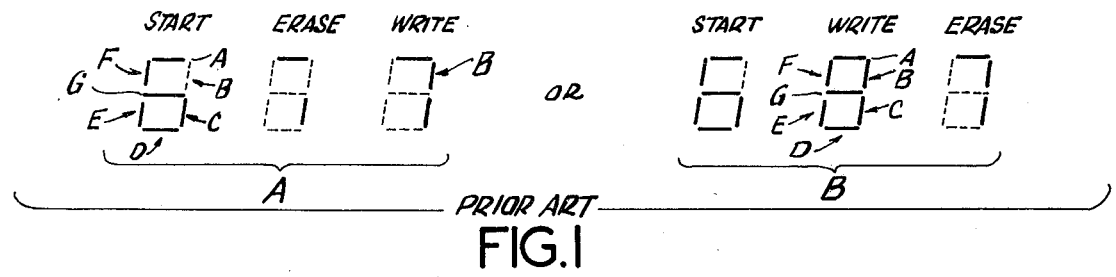
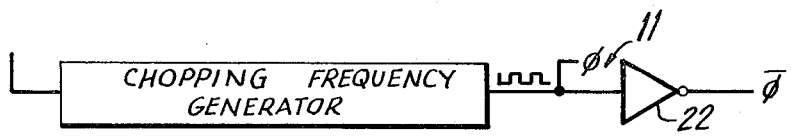
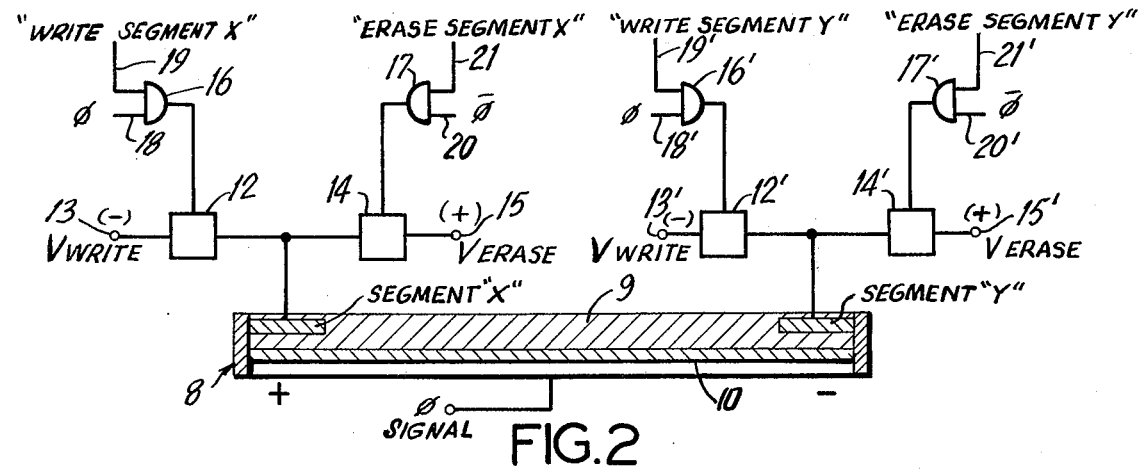
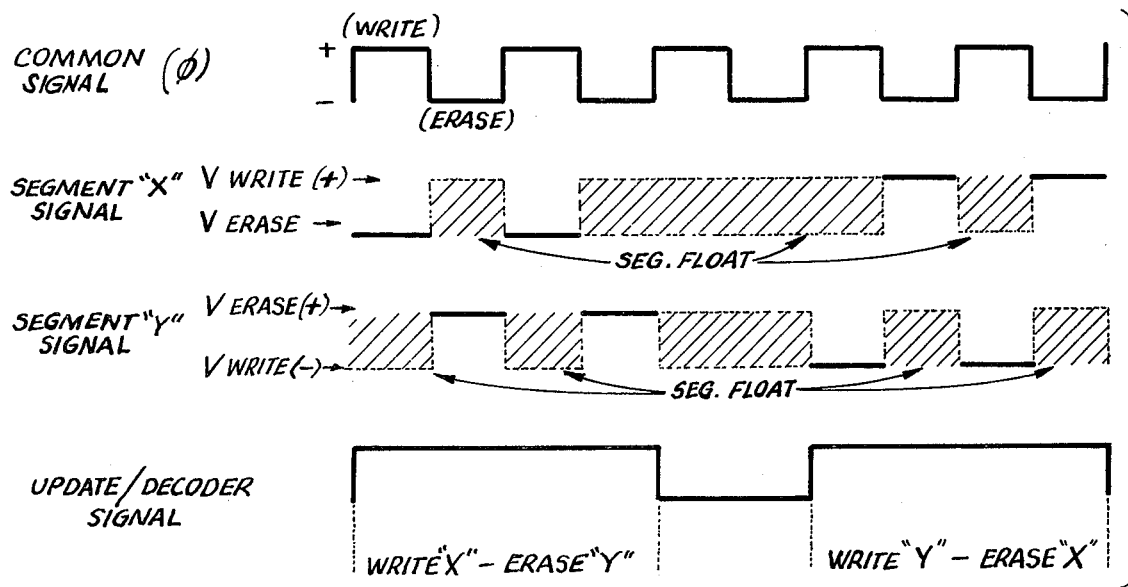

ELECTROCHROMIC DISPLAY DRIVER HAVING INTERLEAVED WRITE AND ERASE OPERATIONS

FIELD OF THE INVENTION

This invention relates to circuits for driving an electrochromic display by means of alternating current to effect the visual appearance of simultaneous writing and erasing of selected segments when changing the information being displayed. Such electrochromic display cells can be utilized to display figures, letters, symbols and the like in a timepiece, calculator, meter or the like.

BACKGROUND OF THE INVENTION

In recent years a great deal of interest has been shown in the provision of electrochromic displays having, for example, a digital or analog readout such as in copending commonly assigned U.S. patent application Ser. No. 547,277 filed Feb. 13, 1975 in the name of Leo Wiesner.

Typically, the driving circuit for or method of changing the information being displayed consisted of the two visually distinct operations of consecutively and separately writing and erasing the selected segments to effect the change, such as in U.S. Pat. Nos. 3,807,832 issued Apr. 30, 1974 to George Augustus Castellion and 3,839,857 issued Oct. 8, 1974 to Donald Joseph Berets and George Augustus Castellion.

Thus, from the prior art, it is known to separately write selected segments by applying a voltage $V_1$ of one polarity (usually negative) with respect to a common electrode for a period to completely write the selected segments and then, consecutively, to erase a segment by separately applying a voltage $V_2$ of opposite polarity with respect to the same common electrode for a period to completely erase the selected segments. It is also known to write and erase only those segments requiring change, when changing or updating the character to be displayed, and to utilize the inherent memory of the display by not switching those segments required to remain in their respective "on" or "off" states.

SOME OF THE PROBLEMS RECOGNIZED AND SOLVED BY THE PRESENT INVENTION

The consecutive operation of updating the prior art displays by completing first the writing process, then the erasing process, or vice versa, results in ambiguities during the transition.

Simultaneous writing and erasing of the respective segments to be written and erased requires two voltages $V_1$ and $V_2$, of opposite polarity, which are not available from the single energy cell usually provided in a wristwatch. Furthermore, simultaneous writing and erasing results in a voltage $V_3 = |V_1| + |V_2|$ existing between a segment to be written and a segment to be erased. This voltage $V_3$ being sufficiently high to cause undesirable electro-chemical reactions leading to degradation of the display.

SUMMARY OF THE INVENTION

Generally speaking, in accordance with the invention, a driving arrangement for an electrochromic display is provided having circuit means for causing fade-in and fade-out of selected segments of a segmented alpha-numerical display when changing the character to be displayed.

The writing and erasing voltages are applied alternately in rapid succession during time intervals which are short compared to those required for complete writing or erasing. In each of these several successive intervals, only partial writing or erasing is achieved. In this manner, the illusion of simultaneous writing and erasing is created, and the appearance of ambiguities or meaningless displays is minimized or entirely avoided. Furthermore, only a single voltage source is required, which is alternately switched in rapid succession between the write condition in which the common electrode is positive and the segments to be written are negative, and the erase condition in which the common electrode is negative and the segments to be erased are positive.

It is therefore an object of the present invention to provide electrochromic display means which cause substantially simultaneous fade-in of one or more segments to be written and fade-out of one or more segments to be erased.

It is a further object of the invention to provide means for updating an electrochromic display which minimizes or eliminates ambiguities or meaningless characters during the updating transition.

It is a further object of this invention to provide means for rapidly alternating write and erase operations using only a single voltage source.

It is still a further object of this invention to provide an improved electrochromic display means having the illusion of simultaneous writing and erasing and which overcomes the abovementioned problems.

Another object is to provide a method of applying potential to an electrochromic display which improves the appearance of the display during updating.

These and other objectives and features of the present invention will be apparent from the description of a preferred embodiment of the invention, taken in conjunction with the accompanying drawings, in which:

FIG. 1 is a plan view of a prior art seven segment electrochromic display indicating the manner in which displayed alpha-numeric information was updated;

FIG. 2 is a logic circuit diagram of the circuitry employed in the preferred embodiment of the invention;

FIG. 3 is a pulse train diagram showing the coincidence activation period of the pulses applied to the display;

DETAILED DESCRIPTION OF THE INVENTION

Figure 4:
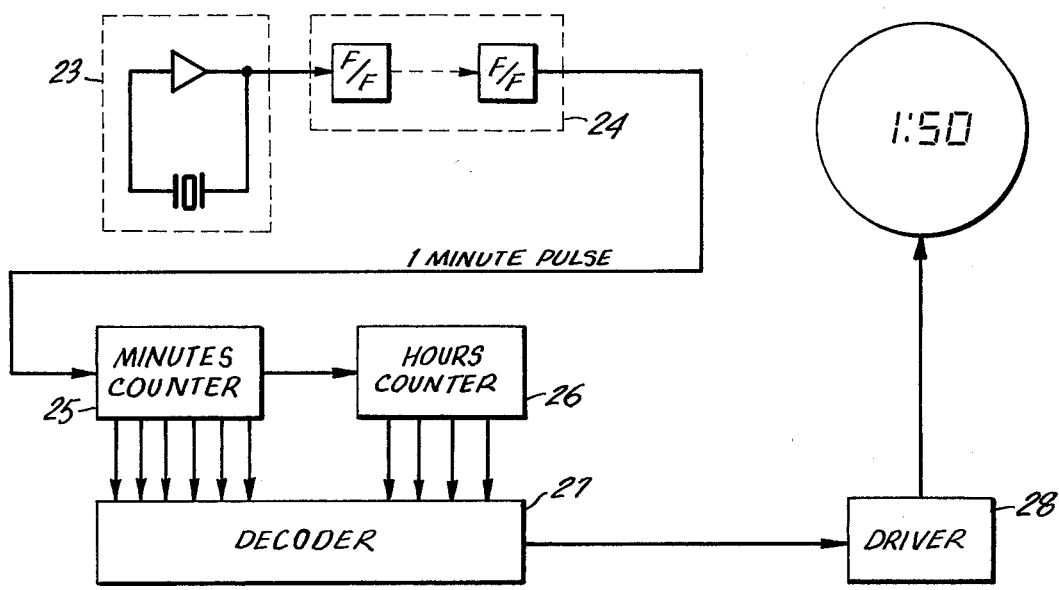
FIG. 4 is a general block diagram of the logic circuitry employed in the preferred embodiment of the invention to provide selective alphanumeric display information in a timepiece.

In order to give better understanding of the present invention, a brief description will first be made with reference to FIG. 1, of the manner of changing the information being displayed by the prior art electrochromic display devices.

In updating digital electrochromic displays, it is preferable to write or erase only those segments of the seven segment array which require change. The segments which are common to both the old and the new alpha-numeric character are not switched, and remain in their previous state because of the memory of the display. This is shown in FIG. 1. The advantage gained, thereby, is a saving in current consumption.

The display is preferably an electrochromic device using a well-known phenomenon such as is described in U.S. Pat. No. 3,704,057 issued Nov. 28, 1972 to Lindley Clair Beegle, No. 3,708,220 issued Jan. 2, 1973 to M. Meyers and T. Augurt and No. 3,807,832 issued Apr. 30, 1974 to George Castellion.

Briefly stated, these electro-optical devices exhibit the phenomenon whereby the light transmitting ability of the display cell is varied by the application of an electric field across the electrochromic material turning it darker, for example, decreasing its light transmitting ability over the area of the electrode-segment activated. The activated electrode-segment retains, in a memory-like manner, this varied light transmitting characteristic till the application of a bleaching electric field is applied.

In the prior art, writing and erasing of electrode-segments was effected in a visually distinctive way. For example, either the segments to be erased were first completely bleached and then the segments to be written were colored, or vice versa. Because of the relatively slow response of the electrochromic display and to provide complete coloring and bleaching, the appearance of the alpha-numeric character(s) during transition of the displayed information was, prior to the present invention, confusing or misleading.

This undesirable characteristic of the prior art electrochromic display devices will be better understood by reference to FIGS. 1A and 1B in which is shown the transition or update of the digital number 6 to 7. The first method, shown in FIG. 1A, is to erase the segments D, E, F and G which are not common to both digits. This produces the confusing ERASE display between START of update, i.e. the digit to be changed, and the WRITE display in which the selected segment(s) B has been colored to form the updated digit.

If, on the other hand with reference to FIG. 1B, the updating sequence is reversed, i.e. first write and then erase, then segment B is colored which results in the misleading WRITE display which illustrates the numeric digit eight.

Reference will now be made to FIGS. 2 and 3 which together show how the segments to be written and erased, i.e. update of the display, are caused to fade-in and fade-out in accordance with the present invention. The electrochromic display cell 8 comprises an electrochromic material 9 disposed between a plurality of segments X, Y and a common electrode 10. Typically, electrochromic displays comprise a plurality of alpha-numeric characters formed by seven segment arrays such as is shown in U.S. Pat. No. 3,839,857. For simplicity and clarity the following explanation of the invention will be directed to the simultaneous fade-in and fade-out of two segments X, Y, it being understood that the number of segments, i.e. number and type of display characters, which can be faded-in and faded-out in accordance with the invention is substantially unlimited.

The common electrode 10 is connected to a source of pulses from, for example, a chopping frequency generator 11 or an output of a stage of a frequency divider such as is found in electronic watches. The common signal pulse $\phi$ is, for example, a unipolarity alternating voltage which varies in value between zero, e.g., a logic "0", and some positive level, e.g., a logic "1", at a predetermined frequency. Each segment X, Y is connected through a first switch means 12, 12' such as a transmission gate, to a write voltage 13, 13' and through a second switch means 14, 14' to an erase voltage 15, 15'. The write voltage 13, 13' is, for example, at battery negative or logic "0" level and the erase voltage 15, 15' is, for example, at battery positive or logic "1" potential.

A write and erase switch control device 16, 16', 17, 17' such as a two input logic "AND" gate is connected to the switch means 12, 12', 14, 14' respectively, to selectively enable the switch means in conjunction with the $\phi$ signal being applied to the common electrode 10, to cause a write or erase potential to be established across the electrochromic material in the area of the selected (activated) segment. Switch control devices 16, 16' have one of their inputs 18, 18' coupled to the $\phi$ signal and their other input 19, 19' coupled to a command write signal means, for example, a decoder. Switch control devices 17, 17' have one of their inputs 20, 20' coupled to a $\bar{\phi}$ signal, i.e. a signal which varies 180° out of phase with the $\phi$ signal, and their other input 21, 21' coupled to a command erase signal means. The write and erase two input AND gate switch control devices 16, 16', 17, 17' are enabled only when there is coincidence of a high or logic 1 on both of their respective two inputs.

In operation, if segment X and Y are to be written and erased, respectively, an enable write (seg.) X and erase (seg.) Y signal command is applied to the respective switch control devices 16, 17'. The logic "AND" gate switch control devices 16, 17' are then alternately enabled by the out-of-phase $\phi$ and $\bar{\phi}$ signals to, thereby, activate or close switch means 12 and 14' during a respective write and erase half-cycle or portion of the $\phi$ signal being applied to the common electrode 10. A segment X write potential is provided by coincidence of a write $\phi$ signal such as a positive or logic "1" on the common electrode 10 and a write voltage 13 such as a negative or logic "0" on segment X. Since switch control device 16 and switch means 12 are, also, enabled when the $\phi$ signal is at the write (logic "1") voltage, coincidence occurs during the write portion of phase of the $\phi$ signal. When the $\phi$ signal alternates to its' erase (logic "0") voltage, the $\bar{\phi}$ signal is at a logic "1" voltage due to the action of invertor 22, which causes switch control device 17' and, therefore, switch means 14' to be enabled. With switch control means 14' enabled, the erase (positive) voltage 15' is provided to segment Y, and, coincidentally, the erase (negative or logic "0") voltage or level of the $\phi$ signal is applied to the common electrode 10 to, thereby, provide or establish an erase (polarity) potential across segment Y and the common electrode.

The frequency of the $\phi$ and, therefore, the $\bar{\phi}$ signal is predetermined such that during a cycle thereof the write and erase potentials provided have a duration or duty-cycle such that only partial or incomplete writing and erasing of the selected segments are effected. Therefore, the segments to be written and erased are caused to partially fade-in and fade-out, respectively, during each cycle of the $\phi$ and $\bar{\phi}$ signals, and to completely fade-in and fade-out after several cycles so as to give the appearance of simultaneous transition or update of the display characters. In this embodiment, a frequency range of, for example, 2 HZ to several KHZ was successfully used.

It was also discovered that the duty cycle or period during which the erase and write potentials are applied may be varied, i.e. they can be applied for different lengths of durations of each cycle of oscillation of the alternating signal, to further improve the appearance of the display during updating.

Referring now to FIG. 4, a block diagram of the electronic circuitry for a timepiece embodiment of this invention is shown. The display is actuated by electronic circuitry which generally consists of a frequency standard 23, frequency dividing unit 24, a minutes counter 25, an hours counter 26, a decoder 27 and the driver circuit 28. Since circuitry for performing these functions is well known to those skilled in the art such as is described in U.S. Pat. No. 3,754,392 issued Aug. 28, 1973 to R. Gary Daniels, exhaustive details thereof are omitted to avoid prolixity.

Figure 5:
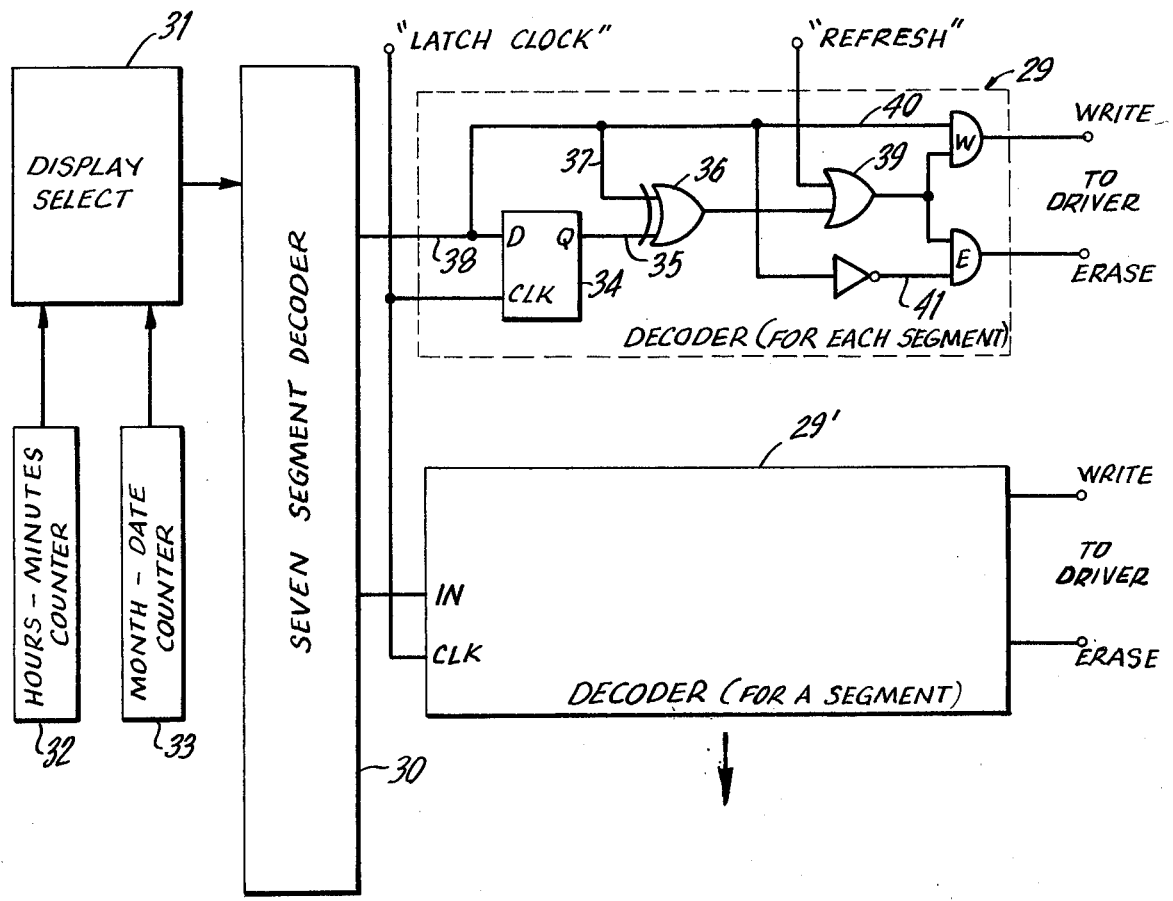
FIG. 5 is a logic circuit diagram of the decoder to provide the write/erase command to the driver circuit shown in connection with FIGS. 2 and 3.

Referring now to FIG. 5, a more detailed logic circuit of a decoder for providing the write and erase commands to the driver circuit shown in FIGS. 2 and 4 will now be described. The operation may best be understood by first considering the decoder logic circuit 29 for one segment, it being understood that each segment of each seven segment display digit has a similar decoder circuit arrangement.

In an electronic watch, for example, the seven segment decoder 30 is connected through a display select circuit 31 to an hours and minutes counter and month and date counter 32, 33. Each output of the seven segment decoder 30 is connected to a segment decoder 29, 29', etc. On start up, the Q output of the D type flip-flop 34 latches in a low level and, therefore, input 35 of "Exclusive-OR" gate 36 is low. The other input 37 of "Exclusive-OR" gate 36 is connected to a respective output of the seven segment decoder 30. The segment(s) to be turned on, is enabled by a high or logic "1" on the respective output 38 of the seven segment decoder 30 which is compared with the Q output of flip-flop 34 and causes a high or logic "1" at the output of "Exclusive-OR" gate 36. This high is on the output of "Exclusive-OR" gate 36 is coupled to the input of the succeeding "OR" gate 39 which causes its' output to go high. The W (write) and E (erase) "AND" gates are therefore provided with a high input. The other inpur 40 of the W gate being coupled to the respective decoder output 38 is high for the segment(s) that is to be turned on, resulting in a command write signal to the driver.

As soon as the display update of the segment(s) is completed, a pulse is applied to the clock input of flip-flop 34. The Q output then indicates the state of the segment, as the information on the D input, which corresponds to the seven segment decoder output, is clocked in.

With a change in the state of the output from the seven segment decoder, i.e. from a write to erase enable, input 41 of the E gate goes high and input 40 of the W gate goes low. Since the output of "OR" gate 39 is high, the E gate is enabled to provide a command erase signal to the decoder. In other words, if the output of the seven segment decoder goes high, the W gate gets two high inputs and the driver as shown in FIG. 2 gets a write command. And if the output of the seven segment decoder goes low, it is inverted at the input of the E gate to a high and the driver as shown in FIG. 2 gets an erase command.

As before, when the display change or update is complete, a clock pulse transfers this new information to the Q output of the flip-flop 34.

During a slewing operation, e.g. when the watch wearer changes the time being displayed, this procedure of transferring the information through the flip-flop latches is avoided by tying the "refresh" input of the "OR" gate, of the digit being slewed, high. Then the write and erase commands are supplied by the segment outputs, as they are connected to the W and E gate inputs.

The "refresh" can also be used periodically to maintain an even display contrast by refreshing the display memory.

It will be obvious that numerous variations could be made by persons skilled in the art within the scope of the foregoing description. Therefore, while certain specific embodiments have been set forth for the invention for the sake of illustration, these are not intended to be limitative. For example, the term "segment" as used throughout the specification and claims refers to a portion of a digit or a digit or hands of an analog display or other indicating indicia. Therefore it should be recognized that, in accordance with the invention, hands of an analog display or entire digits or other indicating indicia can be caused to fade-in and fade-out substantially simultaneously.

What is claimed is:

1. A driver circuit for an electrochromic display cell having at least one segment and a common electrode comprising:
   circuit means for providing a command write signal and a command erase signal;
   alternating signal means for providing to said common electrode a alternating signal having a write signal level and a erase signal level;
   switch means coupled to said circuit means and to said alternating signal means and controlled by said command write signal and said write signal level to provide a voltage to said segment in coincidence with said write signal level being applied to said common electrode for providing a write potential across said common electrode and said segment, said switch means also being controlled by said command erase signal and said erase signal level to provide a voltage to said segment in coincidence with said erase signal level being applied to said common electrode for providing a erase potential across said common electrode and said segment.

2. A driver circuit as in claim 1, wherein:
   the switch means comprises a first switch connected between a first voltage and said segment, a first AND circuit having a output coupled to said first switch and a first input coupled to said circuit means providing a command write signal and a second input coupled to said alternating signal means, a second switch connected between a second voltage and said segment, a second AND circuit having a output coupled to said second switch and a first input coupled to said circuit means providing a command erase signal and at a second input coupled through a signal inverter means to said alternating signal means.

3. A driver circuit as in claim 1, wherein:
   the electrochromic display cell exhibits coloration and bleaching by control of the polarity of an applied electric field for a substantially predetermined duration; and
   the alternating signal comprises a square wave signal which varies between said write signal level and said erase signal level and having a period that each write signal level has a duration that said write potential is applied for a duration which is less than the predetermined duration required to effect a complete coloration and each erase signal level has a duration that said erase potential is applied for a duration which is less than the predetermined duration required to effect complete bleaching; and the circuit means selectively provides a command write signal and a command erase signal having a duration to enable said switch means over a several cycle duration of the alternating signal to selectively effect a complete coloration or a complete bleaching of the segment.

4. A driver circuit as in claim 1, wherein:

the switch means being coupled to a voltage source couples said voltage source across said segment and said common electrode for providing thereby said write potential having a first polarity, said switch means reverses the coupling of said voltage source across said segment and said common electrode for providing said erase potential having a second polarity.

5. An electronic timepiece comprising:

an electrochromic display having a plurality of indicating indicia and a counter electrode;

means for providing electrical signals representing information and a command write signal and a command erase signal;

alternating signal means for providing to said counter electrode an alternating signal having a write signal level and an erase signal level;

display control means responsive to said signals representing information to display an indication of the information, said display control means being responsive to said alternating signal and said command write signal to provide a write voltage to a first indicating indicia in coincidence with said write signal level being applied to said counter electrode whereby a write potential is provided across said counter electrode and said first indicating indicia, said display control means being responsive to said alternating signal and said command erase signal to provide an erase voltage to a second indicating indicia in coincidence with said erase signal level being applied to said counter electrode whereby an erase potential is provided across said counter electrode and said second indicating indicia.

6. An electronic timepiece as in claim 5, wherein:

the electrochromic display exhibits written and erased indicating indicia by the respective application of the write and erase potentials for a substantially predetermined duration;

the alternating signal varies between said write signal level and said erase signal level at a frequency that each write potential being applied has a duration less than the predetermined duration to effect a complete writing whereby a fade-in of said first indicating indicia is effected over several cycles of said alternating signal, and each erase potential being applied has a duration less than the predetermined duration to effect a complete erasing whereby a fade-out of said second indicating indicia is effected over several cycles of said alternating signal; and the command write signal and the command erase signal have a duration that the write potential and erase potential are applied for a duration to effect a complete writing and erasing of the selected indicating indicia.

7. An electronic timepiece comprising:

an electrochromic display having a plurality of segments grouped to form at least the digit and a counter electrode;

means for providing electrical signals representing time information and a command write signal and a command erase signal;

alternating signal means for providing to said counter electrode an alternating signal having a write signal level and an erase signal level;

display control means responsive to said signals representing time information to display an indication of the correct time at least to one digit, said display control means being responsive to said alternating signal and said command write signal to provide a write voltage to a first segment in coincidence with said write signal level being applied to said counter electrode whereby a write potential is provided across said counter electrode and said first segment, said display control means being responsive to said alternating signal and said command erase signal to provide an erase voltage to a second segment in coincidence with said erase signal level being applied to said counter electrode whereby an erase potential is provided across said counter electrode and said second segment.

8. An electronic timepiece as in claim 7, wherein:

the electrochromic display exhibits written and erased segments by the respective application of the write and erase potentials for a substantially predetermined duration;

the alternating signal varies between said write signal level and said erase signal level at a frequency that each write potential being applied has a duration less than the predetermined duration to effect a complete writing whereby a fade-in of said first segment is effected over several cycles of said alternating signal, and each erase potential being applied has a duration less than the predetermined duration to effect a complete erasing whereby a fade-out of said second segment is effected over several cycles of said alternating signal; and the command write signal and the command erase signal have a duration that the write potential and erase potential are applied for a duration to effect a complete writing and erasing of the selected segments.

9. An electronic timepiece as in claim 8, wherein:

the alternating signal is a square wave alternating between a first state corresponding to said write signal level and a second state corresponding to said erase signal level.

10. An electronic timepiece comprising:

an electrochromic display having a plurality of indicating indicia and a counter electrode;

means for providing electric signals representing information and a command write signal and a command erase signal;

a voltage source;

display control means responsive to said signals representing information to display an indication of the information, said display control means being responsive to said command write signal to couple said voltage source across a first indicating indicia and said counter electrode for providing a write potential-polarity across said first indicating indicia and said counter electrode, said display control means also being responsive to said command erase signal to couple said voltage source across a second indicating indicia and said counter electrode for providing a erase potential-polarity across said second indicating indicia and said counter electrode.

11. An electronic timepiece as in claim 10, wherein: the display control means alternates the potential-polarity across the electrochromic display for providing the write potential-polarity and the erase potential-polarity alternately.

12. An electronic timepiece as in claim 10, wherein: each indicating indicia is a segment of a alpha-numeric character.

13. An electronic timepiece as in claim 10, wherein: each indicating indicia is a alpha-numeric character.

14. A method of updating the information being displayed by an electrochromic display cell having a plurality of segments grouped to form indicia and a counter electrode comprising:

applying to said counter electrode an alternating signal that alternates between a write signal level and an erase signal level;

applying for a duration to effect partial erasing of a selected first segment a voltage in coincidence with said erase signal level being applied to said counter electrode to effect by the coincidence a erase potential across the selected first segment and the counter electrode;

applying for a duration to effect partial writing of a selected second segment a voltage in coincidence with said write signal level being applied to said counter electrode to effect by the coincidence a write potential across the selected second segment and the counter electrode;

applying the write and erase potentials across the selected segments and the counter electrode during alternate levels of each cycle of said alternating signal for several cycles of the alternating signal to fade-in and fade-out the selected segments.

* * * * *